E. H. BELDEN.
CLUTCH.
APPLICATION FILED NOV. 30, 1917.
1,390,330.
Patented Sept. 13, 1921.
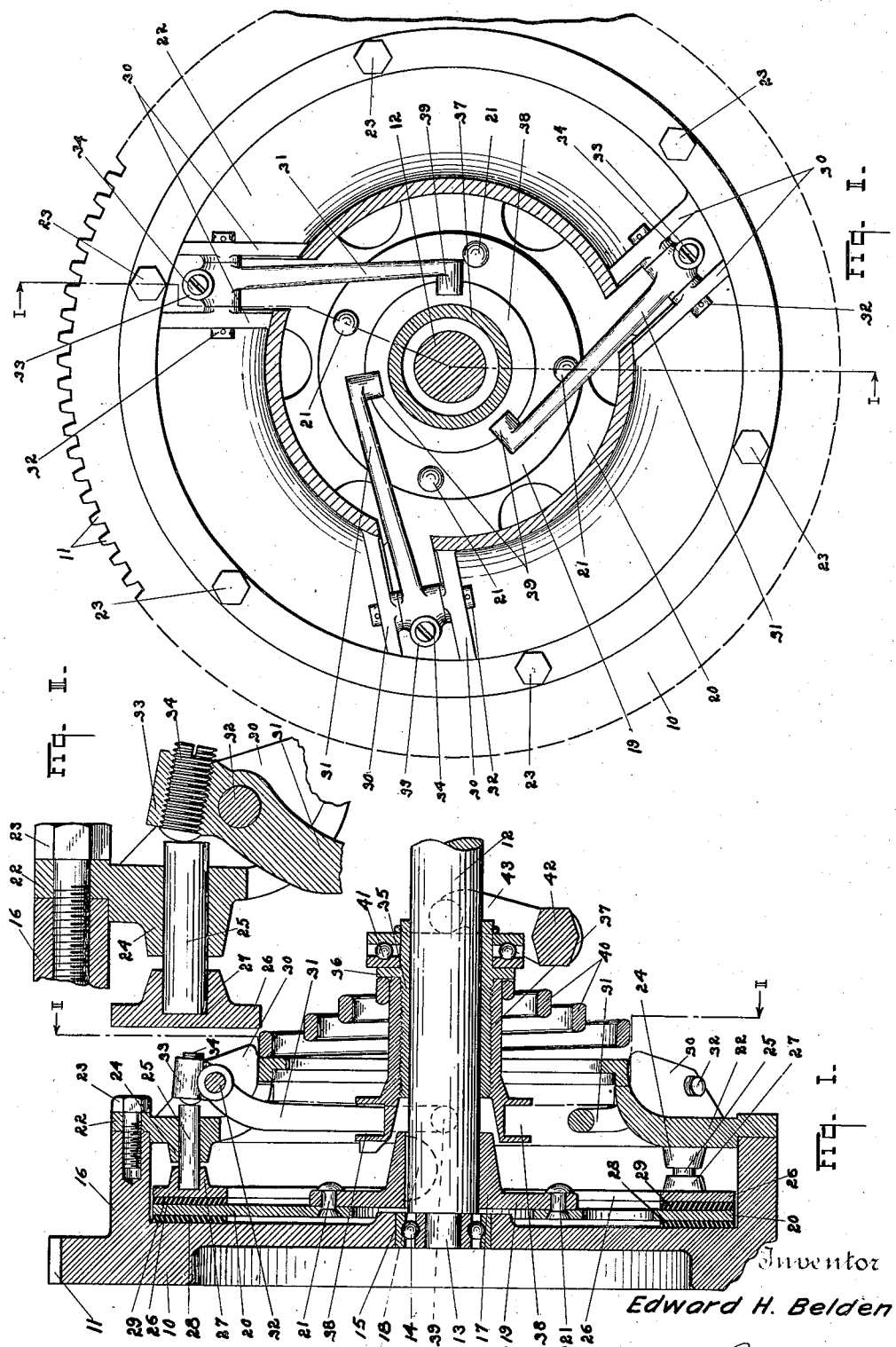
Inventor
Edward H. Belden
By Chester H. Braselton
Attorney

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

CLUTCH.

1,390,330. Specification of Letters Patent. Patented Sept. 13, 1921.

Application filed November 30, 1917. Serial No. 204,634.

*To all whom it may concern:*

Be it known that I, EDWARD H. BELDEN, a citizen of the United States, residing at Toledo, in the county of Lucas and State of Ohio, have invented certain new and useful improvements in Clutches, of which I declare the following to be a full, clear, and exact description.

This invention relates to improvements in clutches and particularly to clutches of the disk type, which are adapted for use in connection with the power transmission of motor vehicles.

The principal object of my invention is to provide an improved and simplified clutch construction in which the adjustments, to compensate for wear of the parts, can be very easily and conveniently effected.

Further objects, and objects relating to economies of manufacture and details of construction, will definitely appear from the detailed description to follow.

I accomplish the objects of my invention by the devices and means described in the following specifications. My invention is clearly defined and pointed out in the appended claims.

A structure consituting a preferred embodiment of my invention is illustrated in the accompanying drawings, forming a part of this specification, in which:

Figure I is a detail sectional view taken through a clutch embodying my invention on a line corresponding to line I—I of Fig. II.

Fig. II is a sectional, elevational view of such a clutch taken on a line corresponding to line II—II of Fig. I, and, Fig. III is an enlarged, fragmentary, sectional view corresponding to a part of Fig. I.

In the drawings, similar reference numerals refer to similar parts throughout the several views, and the sectional views are taken looking in the direction of the little arrows at the ends of the section lines.

Considering the numbered parts of the drawing, I have shown a clutch comprising a driving member, in this instance, the fly-wheel 10, which may be provided with gearing 11 on the periphery thereof, and a driven shaft 12 provided with a pilot stud 13 on its forward end mounted in an annular bearing 14 disposed in the central opening 15 formed in the fly-wheel. The fly-wheel 10 has a rearwardly extending annular flange 16 which forms the side wall of a cylindrical recess formed in the fly-wheel. The member 17 is fastened to the shaft 12 by means of the key 18 and is provided with a peripheral flange 19 to which the clutch disk 20 is secured by means of the rivets 21. The clutch disk is of slightly less diameter than the inside diameter of the flange 16 so that it fits within the cylindrical recess formed in the fly-wheel 10, as clearly appears from Fig. I of the drawing, and said disk 20 is provided with a plurality of openings therein, which serve to lighten the disk without affecting its strength.

A cover plate 22 is secured at its edge to the rear of the flange 16 by means of the bolts 23, a central opening being provided in said cover plate 22 through which the shaft 12 extends and the plate being curved rearwardly adjacent said central opening. A plurality of bosses 24, in this case three, are formed in said cover plate 22 and the pins 25 are slidably mounted in said bosses with their rear ends projecting from the rear face of said cover plate. A clutch ring 26 is provided with a plurality of bosses 27 extending rearwardly therefrom and the forward ends of the pins 25 are mounted in said bosses so that said clutch ring is carried by the pins and is movable axially of the shaft 12 due to the fact that the pins 25 are slidably mounted in the cover plate. Rings 28 and 29 of suitable friction material are disposed between the fly-wheel 10 and the clutch disk 20 and between the clutch disk 20 and the clutch ring 26 respectively.

A plurality of pairs of ears 30 are formed on the cover plate 22 and extend rearwardly therefrom, there being one pair of these ears for each of the sliding pins 25. A lever 31 is fulcrumed between each of said pairs of ears by means of the pin 32, said lever being curved forwardly and extending through a suitable slot provided in the cover plate as shown in Fig. I, so that the inner portion of the lever is inside the chamber formed by the fly-wheel 12 and the cover plate 22, while the outer end is outside of said chamber. Each lever 31 is provided with a head 33 in which a screw-threaded plug 34 is mounted, the head of each of said plugs being in position to engage the rear end of one of the sliding pins 25. The rear end of each screw-threaded plug 34 is provided with a slot by means of which the plug may be rotated to adjust the same in the head 33.

A sleeve 35 is mounted on the shaft 12 so as to slide longitudinally thereof and is provided with a shoulder 36 near the rear end thereof. A sleeve 37 is threaded on the sleeve 35 with its rear end abutting the shoulder 36 and the forward end of the sleeve 37 has an annular groove 38 formed therein. Each of the levers 31 is provided with a laterally-turned finger 39 disposed in said annular groove so that a longitudinal movement on the shaft 12 of the sleeve 35 will rock the levers 31 on their fulcrums. A coiled compression spring 40 of cone-like shape is disposed with its forward end engaging the rear edge of the cover plate 22 and its rear end engaging the shoulder 36. An annular thrust bearing 41 is mounted on the sleeve 35 in engagement with the rear face of the shoulder 36 and the rear face of said annular thrust bearing is in position to be engaged by the fingers 43 of the clutch yoke 42.

From the description of the parts given above, the operation of this device should be readily understood. Normally the spring 40 tends to force the sleeve 35 rearwardly on the shaft 12, thus rocking the levers 31 so that the screw-threaded plugs 34 press forwardly on the pins 25 to hold the clutch ring 26 in clutching engagement with the friction ring 29 between the ring 26 and the clutch disk 20, and to hold the clutch disk 20 in clutching engagement with the ring 28 between said disk and the fly-wheel 10. It will be seen that the clutch ring 26 turns with the fly-wheel 10 and the clutch disk 20 turns with the driven shaft 12, so that, when the parts are in their normal position, the clutch disk 20 is clutched to the fly-wheel 10 and the shaft 12 must turn therewith. To release the clutch, the clutch yoke 42 is operated to cause the fingers 43 to press forward against the thrust bearing 41 so as to move the sleeve 35 forwardly on the shaft 12. This rocks the levers 31 so as to move the screw-threaded plugs 34 rearwardly, thus releasing the pressure on the pins 25 and on the clutch ring 26 and permitting the fly-wheel 10 and the clutch ring 26 to turn independently of the clutch disk 20.

In case the parts wear so that the clutch slips, the screw-threaded plugs 34 may be adjusted in the heads 33, due to their screw-threaded engagement therewith, so as to compensate for the wear of the parts. Sleeve 37 may also be adjusted relative to the sleeve 35 and the wear of the parts may be compensated for, either by adjusting the sleeve 37 or the separate plugs 34, or both adjustments may be resorted to.

It will be seen that the clutch described herein is very simple in construction and affords simple and convenient means of adjustment to compensate for the wear of the parts. Furthermore, this clutch can be conveniently manufactured and permits of rapid and convenient assembly of the parts and likewise the parts of the clutch may be very conveniently and rapidly taken down for the purposes of inspection or repair.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A device of the class described, comprising the combination of a recessed driving member, a driven member, a cover plate upon said driving member, a clutch ring movable within said recessed driving member, a disk connected with said driven member and extending between said driving member and said clutch ring, a plurality of pivotally mounted levers extending through said cover plate, and operatively connected with said clutch ring, and means for actuating said levers.

2. A device of the class described, comprising the combination of a recessed driving member, a driven member, a cover plate upon said recessed driving member having a rearwardly projecting wall, a clutch ring movably mounted upon said driving member within said recess, a disk connected with said driven member and extending between said driving member and said clutch ring, a plurality of levers pivotally mounted upon and extending through said rearwardly projecting wall, pins connected with said clutch ring and adapted to be actuated by said levers, and means for actuating said levers.

3. A device of the class described, comprising the combination of a recessed driving member, a driven member, a cover plate upon said driving member, a clutch ring movable within said recessed driving member, a disk connected with said driven member and extending between said driving member and said clutch ring, a plurality of pivotally mounted levers extending through said cover plate, means operatively connecting said levers with said clutch ring, a member extending through said cover plate into operative engagement with said levers, a spring yieldingly engaging said last mentioned member, tending to effect rearward movement of the same, and means for effecting forward movement of said member.

4. A device of the class described, comprising the combination of a recessed driving member, a driven member, a cover plate upon said recessed driving member, a clutch ring movable within said driving member, a disk connected with said driven member and extending between said driving member and said clutch ring, a plurality of pivotally mounted levers extending through said cover plate having their outer ends operatively connected with said clutch ring, a spring seated upon said cover plate, a member operatively connected with the inner ends of said levers and adapted to be actuated rearwardly by said spring, and means for effecting forward movement of said last mentioned member.

5. A device of the class described, comprising the combination of a recessed driving member, a driven member, a cover plate upon said recessed driving member, a clutch ring movable within said recessed driving member, a disk connected with said driven member and extending between said driving member and said clutch ring, a spring mounted upon the outer face of said cover plate, a sleeve extending through said cover plate and adapted to receive the rear end of said spring, a plurality of levers fulcrumed upon the cover plate having their inner ends operatively connected with the front end of said sleeve and their outer ends operatively connected with said clutch ring, and means for actuating said sleeve.

6. A device of the class described, comprising the combination of a recessed driving member, a driven member, a cover plate upon said recessed driving member having a rearwardly extending reduced portion, a plurality of pairs of spaced lugs upon said cover plate exteriorly of said reduced portion, a lever pivoted between each of said pairs of lugs, said levers having their inner ends extending through openings formed in said cover plate, a pin for each of said levers slidably mounted in said cover plate and extending into engagement with said clutch ring, a sleeve projecting through said cover plate having its front end operatively connected with said levers, a spring upon the reduced portion of said cover plate extending rearwardly into engagement with said sleeve, and means for actuating said sleeve.

7. A device of the class described, comprising the combination of a recessed driving member, a driven member, a cover plate upon said recessed driving member having a rearwardly extending reduced portion, a plurality of levers pivoted upon said cover plate, the inner ends of said levers extending through openings formed in the wall of said cover plate, a pin for each of said levers slidably mounted in said cover plate and loosely engaging said clutch ring, a sleeve projecting through said cover plate and operatively connected with said levers, a spring upon said cover plate extending rearwardly into engagement with said sleeve, and means for actuating said sleeve.

8. A device of the class described, comprising the combination of a driving member, provided with an annular flange forming a substantially cylindrical recess in said member; a plate having its periphery secured to said flange and partially closing said recess, said plate having its central portion curved away from said driving member; a driven member; a plurality of pins slidably mounted in said plate and extending parallel to the axis of said driven member; a clutch ring in said recess carried by said pins; a disk secured to said driven member and housed within said recess with its periphery interposed between said ring and said driving member; a plurality of levers mounted on the outer face of said plate and engaging said pins, the inner ends of said levers extending through slots in said plate into said recess; and means for actuating said levers.

9. A device of the class described, comprising the combination of a driving member having an annular flange forming a substantially cylindrical recess within said member; a plate having its periphery secured to said flange and partially closing said recess, the central portion of said plate being curved away from said driving member and said plate being provided with a plurality of pairs of ears and with a slot adjacent each of said pairs of ears; a driven member, a plurality of pins slidably mounted in said plate, there being a pin disposed adjacent each of said pairs of ears and said pins extending parallel to the axis of said driven member; a clutch ring carried by said pins within said recess; a disk secured to said driven member and housed within said recess with its periphery between said ring and said driving member; a lever fulcrumed between each pair of ears, the inner end of each of said levers extending through one of said slots into said recess; a screw-threaded plug threaded through the outer end of each of said levers and engaging the end of the adjacent pin; and means for actuating said levers.

10. A device of the class described comprising a recessed driving member provided with a cover plate, a driven member within said driving member, a clutch member movable within said driving member, levers pivoted upon and extending through said cover plate and operatively connected with said clutch member and means for actuating said levers to effect movement of said clutch member.

In testimony whereof, I affix my signature.

EDWARD H. BELDEN.